US010056765B2

(12) United States Patent
Schuster et al.

(10) Patent No.: US 10,056,765 B2
(45) Date of Patent: Aug. 21, 2018

(54) ELECTRICAL ENERGY STORAGE APPARATUS HAVING A BALUN FOR BALANCING VOLTAGES OF STORAGE CELLS

(71) Applicant: Liebherr-Components Biberach GmbH, Biberach an der Riss (DE)

(72) Inventors: Wolfgang Schuster, Bad Waldsee (DE); Sven Welser, Aepfingen (DE)

(73) Assignee: Liebherr-Components Biberach GmbH, Biberach an der Riss (DE)

( * ) Notice: Subject to any disclaimer, the term of this patent is extended or adjusted under 35 U.S.C. 154(b) by 18 days.

(21) Appl. No.: 15/105,776

(22) PCT Filed: Dec. 11, 2014

(86) PCT No.: PCT/EP2014/003331
§ 371 (c)(1),
(2) Date: Jun. 17, 2016

(87) PCT Pub. No.: WO2015/090544
PCT Pub. Date: Jun. 25, 2015

(65) Prior Publication Data
US 2016/0315483 A1    Oct. 27, 2016

(30) Foreign Application Priority Data

Dec. 18, 2013  (DE) ........................ 10 2013 021 535

(51) Int. Cl.
*H02J 7/00*  (2006.01)
*H02J 1/00*  (2006.01)
*H02M 3/06*  (2006.01)
*H02M 3/335*  (2006.01)
*H02J 7/34*  (2006.01)

(52) U.S. Cl.
CPC .......... *H02J 7/0019* (2013.01); *H02J 7/0016* (2013.01); *H02J 7/345* (2013.01)

(58) Field of Classification Search
CPC ........ H02J 7/0016; H02J 7/345; H02J 7/0019; H02J 1/102; H02J 3/36; H02J 1/10;
(Continued)

(56) References Cited

U.S. PATENT DOCUMENTS 6,882,061 B1 * 4/2005 Ashtiani ............... H02J 7/0063
                                                               219/209
8,314,592 B2   11/2012 Rudorff et al.
(Continued)

FOREIGN PATENT DOCUMENTS

DE         10039407 A1    2/2002
DE      102005034588 A1    2/2007
(Continued)

OTHER PUBLICATIONS

ISA European Patent Office, International Search Report Issued in Application No. PCT/EP2014/003331, dated Aug. 20, 2015, WIPO, 4 pages.

*Primary Examiner* — Yalkew Fantu
*Assistant Examiner* — Mohammed J Sharief
(74) *Attorney, Agent, or Firm* — McCoy Russell LLP

(57) ABSTRACT

The present invention relates to an electrical energy storage apparatus having a plurality of electrical storage cells connected in series and to an inductive balun for balancing the storage cell voltages, wherein the balun has a balancer transformer having separate single coils for the storage cells and has a respective electric switch for each storage cell. Provision is made in accordance with the invention that the coils of the balancer transformer are connected to a pole of the respective storage cell via a respective at least one inductance and a switch connected to the named inductance, with the switch associated with one respective storage cell being connected via a diode to a pole of a storage cell respective arranged upstream or downstream.

19 Claims, 1 Drawing Sheet

(58) Field of Classification Search
CPC .. H02J 1/08; H02J 3/382; H02M 3/07; H02M 3/33507; H02M 3/18; H02M 3/3376; H02M 3/337; H02M 3/33592; H02M 3/335; H02M 3/33569; H02M 3/33538; Y02E 60/13; H03K 3/53; H03K 3/537; G01R 15/14; Y02B 70/1433; Y02B 70/1475; Y02B 70/126
USPC ........... 320/106; 307/82, 109; 363/17, 21.04
See application file for complete search history.

(56) References Cited

U.S. PATENT DOCUMENTS

| | | | | |
|---|---|---|---|---|
| 2007/0139090 A1* | 6/2007 | Cassel | ............... | H02M 3/07 327/181 |
| 2009/0278496 A1* | 11/2009 | Nakao | ............... | H02J 7/0016 320/118 |
| 2011/0110129 A1* | 5/2011 | Busch | ............... | H02J 9/005 363/53 |
| 2011/0279209 A1* | 11/2011 | Schoessow | ............... | H01F 19/08 336/192 |
| 2012/0161710 A1 | 6/2012 | Mai et al. | | |
| 2012/0212056 A1* | 8/2012 | Ewanchuk | ............... | H02J 7/0014 307/43 |
| 2013/0002208 A1* | 1/2013 | Rozenboim | ............... | H02J 7/0021 320/162 |
| 2013/0249476 A1* | 9/2013 | Touzani | ............... | H01M 10/441 320/107 |
| 2014/0354212 A1* | 12/2014 | Sugeno | ............... | H01M 10/441 320/103 |

FOREIGN PATENT DOCUMENTS

| | | |
|---|---|---|
| DE | 102008048382 A1 | 4/2010 |
| DE | 102009041005 A1 | 3/2011 |
| JP | 2006074839 A | 3/2006 |
| WO | 2006084797 A1 | 8/2006 |

* cited by examiner

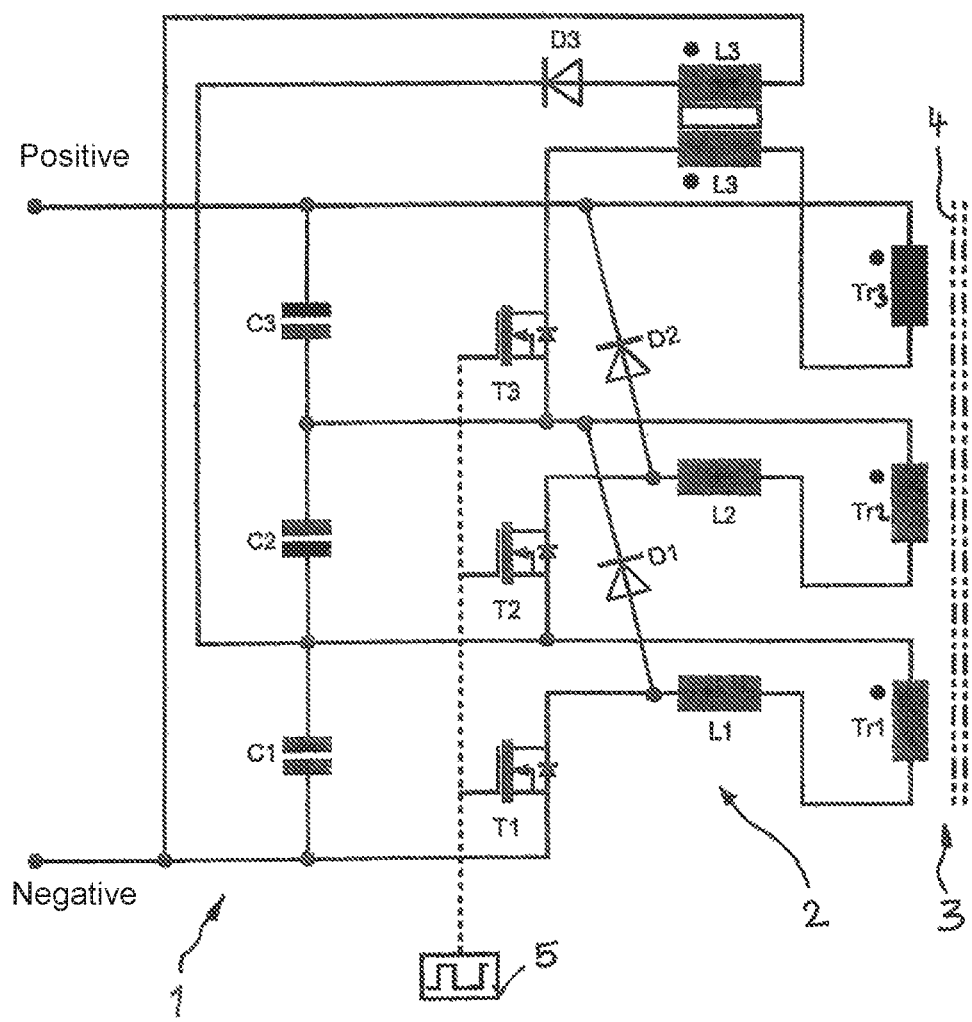

ELECTRICAL ENERGY STORAGE APPARATUS HAVING A BALUN FOR BALANCING VOLTAGES OF STORAGE CELLS

CROSS REFERENCE TO RELATED APPLICATIONS

The present application is a U.S. National Phase of International Patent Application Serial No. PCT/EP2014/003331, entitled "Electrical Energy Storage Device Having a Balancing Circuit," filed on Dec. 11, 2014, which claims priority to German Patent Application No. 10 2013 021 535.8, filed on Dec. 18, 2013, the entire contents of each of which are hereby incorporated by reference in their entirety for all purposes.

TECHNICAL FIELD

The present invention relates to an electrical energy storage apparatus having a plurality of electrical storage cells connected in series and to an inductive balun for balancing the storage cell voltages, wherein the balun has a balancer transformer having separate single coils for the storage cells and has a respective electric switch for each storage cell.

BACKGROUND AND SUMMARY

To be able to efficiently operate electrical machines which have highly variable and cyclic power consumption, it is necessary to provide energy stores which can store high amounts of energy and can receive and output them at short notice. Such demands are made, for example, with self-propelled work machines which comprise electrical traction drives, for example mobile construction machinery, but also stationary plant which at times cannot be connected to the public grid due to highly changing power consumption and which require their own generator. Such energy stores are, however, generally also sensible for on-grid machines having electrical drives if they have a highly variable and cyclic power consumption.

Electrical energy storage elements such as capacitors which allow fast charging and discharging, however, typically have a limited store of energy which is not sufficient for applications with high amounts of energy to be stored. It is therefore usually necessary to connect such energy storage elements to form storage modules. To be able to achieve high voltage values in this respect, a plurality of energy storage elements have to be connected in series with low nominal voltage values of the individual elements.

It must, however, in particular be ensured when charging electrical energy storage elements connected in series that not a single one of the energy storage elements is overloaded voltage-wise. There can be a risk of an overload of an individual element both with storage batteries and with capacitors if said individual element has already been charged to the nominal voltage when charging, but other elements are still considerably remote from their nominal voltage and therefore have to be charged further.

Double-layer capacitors which do not have an electrically insulating dielectric, but which typically do have an electrolyte between their two electrodes are particularly powerful per se, but are also provided with a very small nominal voltage. The storage of the electrical energy takes place here by charge transfer at the boundary surfaces, whereby large capacity values are achieved, but the permitted voltage is simultaneously limited to a few volts. If an energy store is built up of a plurality of such capacitors which are connected in series, no single capacitor may exceed its permitted voltage maximum since otherwise irreversible changes to the electrolyte would take place.

Baluns can be used to utilize the permitted energy content of the storage elements as much as possible, but, on the other hand, to avoid any overcharging or overvoltages. If the storage cell voltages of a storage block are balanced, the storage cells age in the same manner and the block is given its longest service life in this manner. With fully charged double-layer capacitor storage cells, an additional voltage of only 0.1 V can already halve the service life.

There are different approaches for such baluns. A distinction must first be made between passive solutions and active solutions. Whereas in passive solutions, energy is converted into heat and the cell voltage is thus lowered at too high a cell voltage, active solutions can produce a charge balance between the cells with a low voltage and those with a high voltage.

Such active solutions are available with capacitive or with inductive circuit components. In capacitive processes, a capacitor is typically connected across the cell having the highest voltage, with this capacitor then being placed across the cell having the lowest voltage. In the inductive solutions, a balance is established across a number of individual transformers or across a common transformer having multiple windings.

Different already known baluns for storage cells connected in series are known, for example, from the documents DE 100 39 407 A1, DE 10 2005 034 588 A1, DE 10 2009 041 005 A1 or DE 10 2008 048 382 A1.

With the known inductive, active baluns which produce a charge balance between the cells having a low voltage and the cells having a high voltage with inductive components, the previous solutions are capable of improvement in various aspects. If only one common balancer transformer is used for the storage cells connected in series due to the high price of a large number of single transformers, a further common coil which is connected to the output voltage of the storage block is typically provided beside the plurality of individual windings, one each per storage cell.

In this respect, energy can be taken from the sum voltage of the storage block and a switching power supply can be built, for example in the form of a flyback, which feeds the stored energy into each individual cell via diodes. The diodes can achieve that the cell having the lowest voltage receives most of this energy so that a balance is brought about. On the other hand, a switching power supply can also be built with the energy of the storage cells, with the inductive discharge being centrally fed into a sum rail. In this case, the storage cell having the highest voltage contributes most to the current flow so that its voltage is lowered. In this respect, the transformer likewise has to have a further coil beside the individual coils which has a winding number which is calculated from the number of windings of the individual coil times the number of storage cells.

In both cases, the common balancer transformer requires, beside the n coils for the n storage cells, an additional coil having a high number of windings which is to be calculated for a respective specific number of cells and which changes when a different number of cells is used.

In the named processes which transport energy from the storage cells via a common transformer into other cells or into a sum rail, the balance current flow is typically not limited. However, this has the result that the current can adopt a non-defined high value which depends on the voltage difference of the individual cells. Accordingly, the electronic switch for the individual cell, in particular the corresponding transistor, has to be of very large dimensions since its maximum current is not fixed. The cables from the balun to the taps of the storage block furthermore also require a higher cross-section. The plug systems become more expensive.

Starting from this, it is the underlying object of the present invention to provide an improved electrical energy storage apparatus of the initially named type which avoids disadvantages of the prior art and further develops the latter in an advantageous manner. An efficient, simply built inductive balun should in particular be provided whose balancer transformer has a simple and inexpensive design and whose switches can be controlled simply and are only exposed to small amounts of energy.

The named object is achieved in accordance with the invention by an electrical energy storage apparatus having a plurality of electrical storage cells connected in series and having an inductive balun for balancing voltages of the storage cells, wherein the balun has a balancer transformer having separate coils for the storage cells and has a respective electric switch for each storage cell, wherein the coils of the balancer transformer are connected via at least one respective inductance and via the electric switch connected to the named inductance to a pole of the respective storage cell, with the electric switch associated with a respective storage cell being connected via a diode to a pole of a respective storage cell arranged upstream or downstream.

Provision is therefore made in accordance with the invention that the coils of the balancer transformer are connected to a pole of the respective storage cell via a respective at least one inductance and a switch connected to the named inductance, with the switch associated with the one respective storage cell being connected via a diode to a pole of a storage cell respectively arranged upstream or downstream. Balance currents can be limited via the named diodes and the switches can be operated with limited currents or voltages.

In this respect, in a further development of the invention, the circuit components associated with a respective storage cell and comprising an electrical switch, the potential-separated coil of the balancer transformer, an inductance and a diode can in particular be connected to one another such that a first terminal of the named coil is respectively connected to the positive pole of the associated storage cell, a second terminal of the named coil is connected to a first terminal of the inductance, the second terminal of the inductance is connected to a first terminal of the aforesaid switch, the second terminal of the switch is connected to the negative pole of the associated storage cell, the anode of the aforesaid diode is connected to the first terminal of the switch and the cathode of the diode is connected to the positive pole of that storage cell which follows as the next in the positive direction in the serial connection. The diode connected to the switch of a first storage cell can therefore be connected to the positive pole of the second storage cell which follows the first storage cell as the next in the positive direction. It could generally also be considered to jump over one or more storage cells in the connecting of the diode, that is to connect the diode connected to the switch of the first storage cell to the positive pole of the third or fourth storage cell. The aforesaid connection to the directly next storage cell in the positive direction, however, allows a more simple wiring and a more uniform voltage balancing.

In accordance with another further development of the invention, the order in the serial connection of the transformer winding and the inductance can be reversed, in particular such that the first terminal of the inductance is respectively connected to the positive pole of the associated storage cell and the second terminal of the transformer winding is connected to the first terminal of the switch.

In the topmost storage cell, which is connected to the positive pole of the storage block, and indeed in particular directly without the interposition of further storage cells, the inductance can be formed as a storage choke, with the named storage choke being able to comprise two coils which are the same. In this respect, a first coil of this storage chock can advantageously be connected in accordance with the inductances in the other storage cells, whereas the second coil of the named storage choke advantageously leads in series with a further diode to the respective positive terminal or negative terminal of the bottommost storage cell which contacts the negative terminal of the storage block. In this respect, the cathode of this further diode can advantageously face toward the positive pole of the lower storage cell.

The balun advantageously manages with only one balancer transformer which is associated with all storage cells together, with the named transformer being able only to have coils with the same number of windings, with the coil advantageously being able to be designed using a commercial ribbon cable. For the arrangement of n—for example 24—storage cells, n—for example then 24—separate coils are provided, which can be implemented easily and inexpensively by a corresponding n-pole—for example 24-pole—ribbon cable.

In a further development of the invention, the balancer transformer can be formed from a transformer core around which windings of a ribbon line are wound. Each lead of the ribbon line can advantageously form a galvanically separated or a potential-separated coil on the balancer transformer.

Such a ribbon line of the balancer transformer having conventional flat ribbon plugs can advantageously be guided and connected or contacted on a printed circuit board at which further components of the balun are provided.

The named balancer transformer can advantageously have a plurality of such coils with ribbon lines.

The core of the balancer transformer can, in a further development of the invention, at least partly comprise a highly permeable ferrite material. In a further development of the invention, the core of the balancer transformer can at least partly comprise nano-crystalline and/or amorphous ferrite materials.

Provision can be made in an advantageous embodiment of the invention that with respect to the switches associated with the storage cells, only one switch per storage cell is provided.

The electric switches can generally be configured in different manner in this respect. In a further development of the invention, at least one of the electric switches is designed as a transistor with all the electric switches being able to be designed as transistors in a further development of the invention.

In a further development of the invention, at least one electric switch, in particular also every electric switch, can be formed as a MOSFET or as an IGBT transistor.

A further advantageous embodiment of the invention can comprise that at least one electric switch, in particular every electric switch, is designed as a bipolar NPN transistor having an anti-parallel diode.

In a further development of the invention, a uniform control, which can in particular be implemented in the form of only one single control circuit, can be provided for a plurality of electric switches, preferably all the electric switches, which are associated with the storage cells.

In an advantageous further development of the invention, the control terminals of a plurality of electric switches, in particular of all the electric switches, can be acted on by a constant signal, in particular such that all the switches switch on simultaneously and/or switch off simultaneously in a synchronous manner.

Only in pulse generator circuit can advantageously be used to control all the control terminals.

The control of the electric switches can be separated from the storage block potential-wise or galvanically via a gate transformer and/or via optocouplers.

Comparators, operation amplifiers or other control circuit components can be dispensed with on the side of the storage elements.

The invention will be illustrated in more detail in the following with respect to a preferred embodiment and to an associated drawing.

BRIEF DESCRIPTION OF FIGURES

FIG. 1 shows a schematic representation of an electrical energy storage system having a plurality of storage cells in the form of capacitors connected in series and having an inductive balun for balancing the storage cell voltages in accordance with an advantageous embodiment of the invention.

DETAILED DESCRIPTION

As FIG. 1 shows, an energy store 1 or an energy storage module can comprise a plurality of storage cells C1, C2 and C3 which are connected in series or serially and which are connected to a common negative pole and to a common positive pole of the energy store 1. The storage cell C1 is in this respect directly connected to the negative pole while the storage cell C3 is disposed closest to the positive pole of the energy store 1.

Even though FIG. 1 only shows three storage cells C1, C2 and C3, it is understood that the energy store 1 can comprise any desired number, in particular a plurality, of storage cells C1 . . . Cn which are connected in series with one another.

As FIG. 1 shows, a balun 2 is associated with the storage cells C1, C2 and C3 connected in series and which comprises a balancer transformer 3 which is common to all storage cells and which comprises a number of galvanically separated coils Tr1, Tr2 and Tr3—three in the embodiment of FIG. 1—corresponding to the number of storage cells. The named coils Tr1 . . . Tr3 can in this respect be configured in the form of a ribbon line which is wound around a transformer core 4. The leads of the named ribbon line form the separate coils which are associated with the storage cells.

As FIG. 1 shows, a respective first terminal of each of the coils Tr1, Tr2 and Tr3 can be connected to the positive pole of the respective associated storage cell C1, C2 and C3, while the respective second terminal of the named transformer coil Tr1, Tr2 or Tr3 is connected to a first terminal of an inductance L1, L2 and L3 which are each likewise associated with one of the named storage cells C1, C2 and C3. The respective first terminal of the named inductances L1, L2 and L3 can in this respect, as shown in FIG. 1, be connected to one of the named coils Tr1, Tr2 and Tr3, while the second terminal of the respective inductance L1, L2 and L3 is connected to the first terminal of an electric switch T1, T2 or T3, with such a switch T1, T2 and T3 being associated with the respective storage cell C1, C2 or C3, respectively.

The second terminal of each switch T1, T2 and T3 can in particular be connected to the negative pole of the respective associated storage cell C1, C2 and C3, cf. FIG. 1.

In this respect, the order in the series connection of coil Tr1, Tr2 and T3 and of the inductance L1, L2 and L3 can be swapped over such that the respective first terminal of the inductance L1, L2 and L3 is connected to the positive pole of the associated storage cell C1, C2 and C3, while the second terminal of the coil Tr1, Tr2 and Tr3 is connected to the first terminal of the switch T1, T2 and T3.

As FIG. 1 shows, a uniform control can be provided for the named switches T1, T2 and T3, wherein in particular a pulse generator circuit 5 can be provided for all the switches T1, T2 and T3 together which applies a constant signal to all the electric switches T1, T2 and T3 so that all the switches T1, T2 and T3 switch on simultaneously and also switch off simultaneously in a synchronous manner.

In the topmost storage cell C3, which is connected to the positive pole of the storage block 1, the inductance L3 can be designed as a storage choke having two coils which are preferably the same, wherein the first coil of this storage choke can be connected, like the other inductances L1 and L2 in the other storage cells C1 and C2, the first terminal of the inductance is connected to the winding and the second terminal of the inductance to the switch T3 (or actually in the aforesaid reverse manner). The second winding of the named storage choke L3 can in each case lead in series with a further diode D3 to the positive or negative terminal of the bottommost storage cell C1 which contacts the negative terminal of the energy store 1, wherein the cathode of this further diode D3 faces toward the positive pole of the lower storage cell.

As FIG. 1 shows, the balun 2 can comprise diodes D1, D2 which are each provided for an associated storage cell C1 and C2, wherein the anode of the respective diode D1, D2 is advantageously connected to the first terminal of the aforesaid switch T1, T2 of the associated storage cell C1, C2, while the cathode of the diode D1, D2 can be connected to the positive pole of the associated storage cell C1, C2 which follows as the next in the positive direction in the series connection, cf. FIG. 1.

The invention claimed is:

1. An electrical energy storage apparatus having a plurality of electrical storage cells connected in series and having an inductive balun for balancing voltages of the storage cells, wherein the balun has a balancer transformer having separate coils for the storage cells and has a respective electric switch for each storage cell, wherein the coils of the balancer transformer are connected via at least one respective inductance and via the respective electric switch connected to the named inductance to a pole of a respective storage cell, with the respective electric switch associated with the respective storage cell being connected via a diode to a pole of a respective storage cell arranged upstream or downstream, and wherein, for each respective coil of the balancer transformer, the at least one respective inductance connected to the respective coil is connected between the respective coil and the respective electric switch, wherein a first coil of a storage choke is arranged between the coil of the balancer transformer and the respective electric switch, which are associated with a selected storage cell, and is connected at a terminal to a winding and at another terminal to the respective electric switch, while a second coil of the storage choke respectively leads in series with a further diode to a positive terminal and to a negative terminal of the selected storage cell which contacts a negative terminal of a storage block, wherein a cathode of the further diode faces toward a positive pole of the selected storage cell.

2. The electrical energy storage apparatus in accordance with the claim 1, wherein components of the balun associated with the respective storage cell and comprising the respective electric switch, a potential-separated coil of the balancer transformer, the inductance, and the diode are connected to one another such that a first terminal of the potential-separated coil is connected to the positive pole of the respective storage cell, a second terminal of the potential-separated coil is connected to a first terminal of the inductance associated with the respective storage cell, a second terminal of the inductance associated with the respective storage cell is connected to a first terminal of the respective electric switch, a second terminal of the respective electric switch is connected to a negative pole of the respective storage cell, an anode of the diode is connected to the first terminal of the respective electric switch, and a cathode of the diode is connected to a positive pole of a selected next storage cell which follows the respective storage cell next in a positive direction in the series connection of the storage cells.

3. The electrical energy storage apparatus in accordance with the claim 2, wherein an order in the series connection of the potential-separated coil and the inductance associated with the respective storage cell is swapped over such that the first terminal of the inductance associated with the respective storage cell is connected to the positive pole of the respective storage cell and the second terminal of the potential-separated coil is connected to the first terminal of the respective electric switch.

4. The electrical energy storage apparatus in accordance with claim 1, wherein, in a topmost storage cell which is connected to a positive pole of an energy store, an inductance associated with the topmost storage cell is configured as the storage choke having two coils which are the same, and wherein the topmost storage cell is the selected storage cell.

5. The electrical energy storage apparatus in accordance with claim 1, wherein the electric switches are configured as transistors.

6. The electrical energy storage apparatus in accordance with claim 1, wherein the electric switches are configured as MOSFET or IGBT transistors.

7. The electrical energy storage apparatus in accordance with claim 1, wherein the electric switches are designed as bipolar NPN transistors having an anti-parallel diode.

8. The electrical energy storage apparatus in accordance with claim 1, wherein a uniform control is provided for all the electric switches.

9. The electrical energy storage apparatus in accordance with claim 1, wherein only one pulse generator circuit is provided for controlling all the electric switches.

10. The electrical energy storage apparatus in accordance with claim 1, wherein control of the electric switches is galvanically separated from the storage cells via at least one of a gate transformer and/or via optocoupler circuits.

11. The electrical energy storage apparatus in accordance with claim 1, wherein the balance transformer comprises a transformer core around which windings of a ribbon line are wound, and whose leads form separate coils on the balancer transformer.

12. The electrical energy storage apparatus in accordance with claim 11, wherein ribbon plugs of the ribbon line are connected and contacted on a printed circuit board which has further balance components of the balun.

13. The electrical energy storage apparatus in accordance with claim 11, wherein the balancer transformer has a plurality of coils with ribbon lines.

14. The electrical energy storage apparatus in accordance with claim 11, wherein the transformer core of the balancer transformer at least partly comprises a highly permeable ferrite material, and wherein the transformer core of the balancer transformer at least partly comprises nano-crystalline and/or amorphous ferrite materials.

15. The electrical energy storage apparatus in accordance with claim 1, wherein only one electric switch is associated with each storage cell.

16. The electrical energy storage apparatus in accordance with claim 1, wherein control of the balun is free of comparators and operation amplifiers on sides of the storage cells.

17. The electrical energy storage apparatus in accordance with claim 1, wherein the balun only comprises one balancer transformer which is associated with all storage cells together.

18. The electrical energy storage apparatus in accordance with claim 1, wherein only one inductance is associated with each storage cell, and wherein only one respective diode is provided for each storage cell.

19. An electrical energy storage apparatus having a plurality of electrical storage cells connected in series and having an inductive balun for balancing voltages of the storage cells, wherein the balun has a balancer transformer having separate coils for the storage cells and has a respective electric switch for each storage cell, wherein the coils of the balancer transformer are connected via at least one respective inductance and via the respective electric switch connected to the named inductance to a pole of a respective storage cell, with the respective electric switch associated with the respective storage cell being connected via a diode to a pole of a respective storage cell arranged upstream or downstream, wherein, for each respective coil of the balancer transformer, the at least one respective inductance connected to the respective coil is connected between the respective coil and the respective electric switch, and wherein control terminals of all the electric switches are acted on by a constant control signal so that all the switches switch on/off simultaneously and/or switch off simultaneously in a synchronous manner.

* * * * *